(12) United States Patent
Mayollet

(10) Patent No.: US 10,718,488 B2
(45) Date of Patent: Jul. 21, 2020

(54) LIGHT PROJECTION DEVICE FOR A LIGHT SIGNALING FUNCTION

(71) Applicant: OBSTA, Sevres (FR)

(72) Inventor: Laurent Mayollet, Mons-en-Baroeul (FR)

(73) Assignee: OBSTA, Sevres (FR)

( * ) Notice: Subject to any disclaimer, the term of this patent is extended or adjusted under 35 U.S.C. 154(b) by 0 days.

(21) Appl. No.: 16/324,367

(22) PCT Filed: Aug. 8, 2017

(86) PCT No.: PCT/FR2017/052210
§ 371 (c)(1),
(2) Date: Feb. 8, 2019

(87) PCT Pub. No.: WO2018/029427
PCT Pub. Date: Feb. 15, 2018

(65) Prior Publication Data
US 2019/0219247 A1   Jul. 18, 2019

(30) Foreign Application Priority Data

Aug. 9, 2016 (FR) .................................... 16 57655

(51) Int. Cl.
*F21V 7/04* (2006.01)
*G08G 5/00* (2006.01)
*F21V 5/00* (2018.01)
*B64F 1/20* (2006.01)
*F21Y 115/30* (2016.01)
(Continued)

(52) U.S. Cl.
CPC .............. *F21V 7/041* (2013.01); *B64F 1/205* (2013.01); *F21V 5/007* (2013.01); *G08G 5/0026* (2013.01); *B64D 2203/00* (2013.01); *F21V 13/04* (2013.01); *F21W 2111/06* (2013.01); *F21Y 2115/30* (2016.08)

(58) Field of Classification Search
CPC .......... F21V 7/041; F21V 7/046; F21V 13/04; F21V 13/045; F21V 5/007; B64F 1/205; G08G 5/0026; F21W 2111/06; F21Y 2115/30; B64D 2203/00
See application file for complete search history.

(56) References Cited

U.S. PATENT DOCUMENTS 6,364,506 B1 * 4/2002 Gallo ..................... F21V 13/04
362/245
6,464,373 B1   10/2002 Petrick
(Continued)

FOREIGN PATENT DOCUMENTS

CN   102901049 A   1/2013
EP      1698823 A2   9/2006

*Primary Examiner* — Alan B Cariaso
(74) *Attorney, Agent, or Firm* — Berenato & White, LLC

(57) ABSTRACT

The invention relates to a projector (1) for light signalling, comprising—a conical mirror (16) having a truncated-cone shape (6), a plurality of laser diodes (5) emitting a light intensity towards the conical mirror (16), the inclination of the laser diodes (5) with respect to the conical surface (9) is such that the light projector (1) reflects the light intensity of the plurality of diodes (5) perpendicular to the axis (Z) of the cone, such that the conical mirror (16) reflects all of the light intensity of the plurality of laser diodes (5).

19 Claims, 3 Drawing Sheets

(51) Int. Cl.
*F21V 13/04* (2006.01)
*F21W 111/06* (2006.01)

(56) References Cited

U.S. PATENT DOCUMENTS

| | | | |
|---|---|---|---|
| 7,815,344 B2 * | 10/2010 | Bleiner et al. | E01F 9/654 |
| | | | 362/311.1 |
| 9,016,896 B1 | 4/2015 | Roudeski | |
| 9,239,288 B1 | 1/2016 | Wilkinson et al. | |
| 2006/0291209 A1 * | 10/2006 | Booth et al. | F21V 7/0008 |
| | | | 362/247 |
| 2011/0305014 A1 * | 10/2011 | Peck | F21V 1/00 |
| | | | 362/235 |
| 2012/0230027 A1 | 9/2012 | Boomgaarden et al. | |
| 2013/0242566 A1 | 9/2013 | Kim | |

* cited by examiner

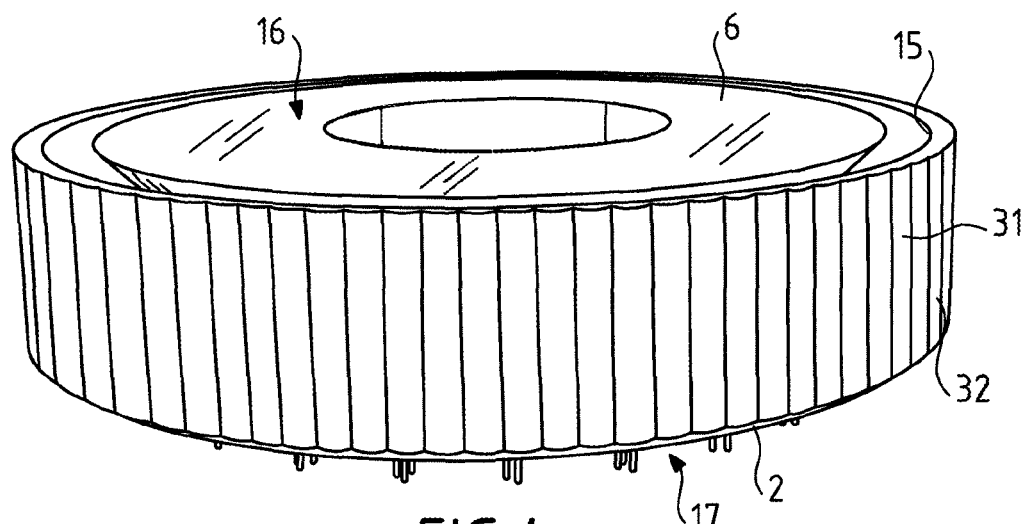
FIG.4
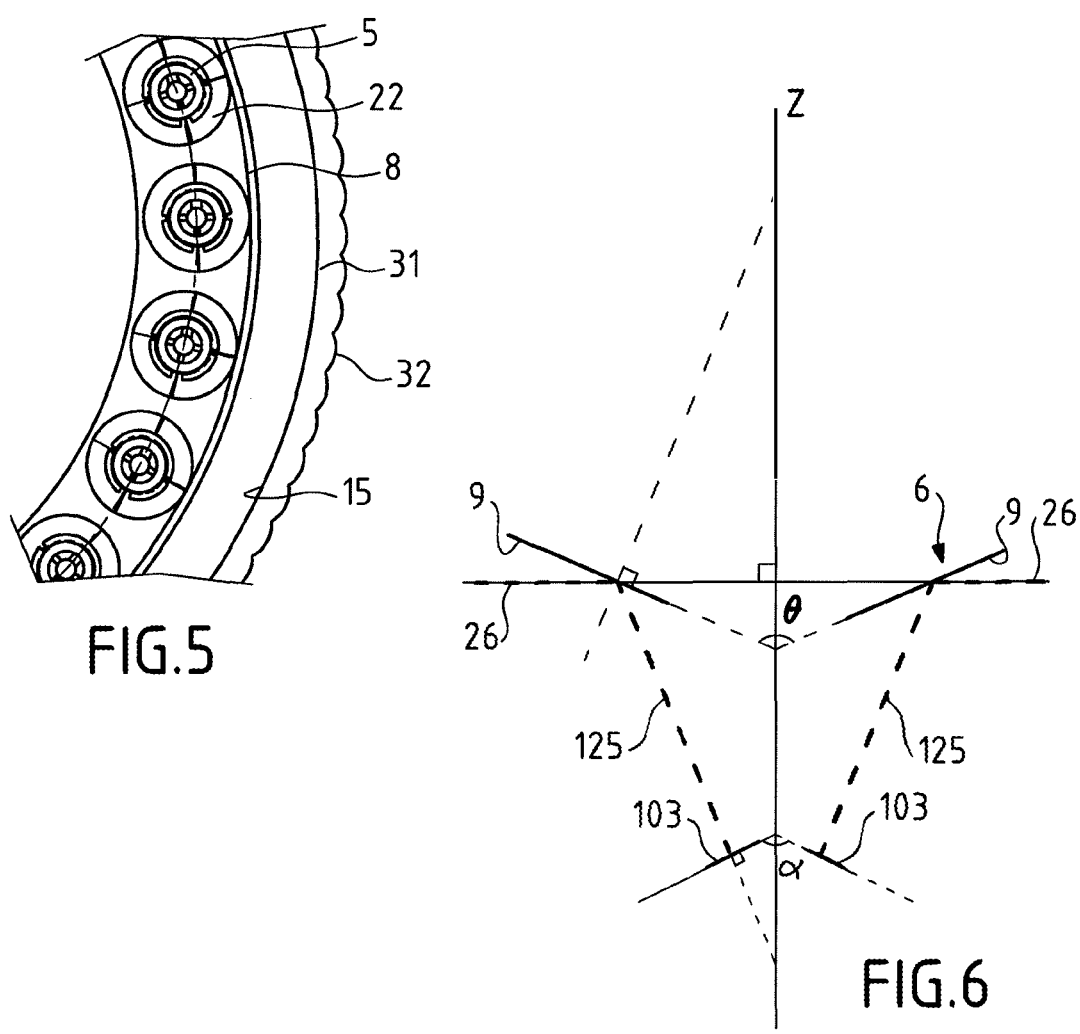
FIG.5
FIG.6

LIGHT PROJECTION DEVICE FOR A LIGHT SIGNALING FUNCTION

CROSS-REFERENCE TO RELATED APPLICATIONS AND CLAIM TO PRIORITY

This application is a national stage application of International Application No. PCT/FR2017/052210 filed Aug. 8, 2017, which claims priority to French Patent Application No. 1657655 filed Aug. 9, 2016, the disclosures of which are incorporated herein by reference and to which priority is claimed.

FIELD OF THE INVENTION

The invention relates to the field of lighting devices for signaling, notably for the aerial signaling of aerial obstacles, for example pylons.

BACKGROUND OF THE INVENTION

Signaling devices intended for aircraft are used on aerial obstacles. Signaling devices using light-emitting diodes (LEDs) are known for the aerial signaling intended for aircraft. However, these signaling devices are bulky owing to the sophistication of the collimators and of the light projection devices used. The reason for this is that, as the LEDs emit in all directions of space, the signaling devices must collect the light emitted by the LEDs such that the light intensity then resulting is sufficient for aerial signaling, in other words from 2000 to 20000 candelas.

SUMMARY OF THE INVENTION

One idea on which the invention is based is to provide a compact light projection signaling device. Thus, the installation of such a light projection device on an obstacle to be signaled, for example an aerial obstacle, is facilitated.

Another idea on which the invention is based is to provide a light projection signaling device emitting a light intensity that is sufficient to ensure a light signaling function, for example an aerial light signaling function.

According to one embodiment, the invention provides a light projection signaling device, comprising
 a conical mirror having a truncated cone shape with a symmetry of revolution about a cone axis,
 a plurality of laser diodes disposed around the cone axis and emitting a light intensity toward the conical mirror, the conical mirror furthermore having a first end edge and a second end edge perpendicular to the cone axis, the first end edge of the conical mirror being a circle having a first radius and the second end edge of the conical mirror being a circle having a second radius, less than the first radius, the second edge being turned toward the laser diodes, the inclination of the laser diodes with respect to the conical surface is such that the light projection device reflects the light intensity from the plurality of diodes perpendicularly to the axis of the cone,
 the laser diodes being disposed at distances from the axis of the cone in the range between the first radius and the second radius,
 in such a manner that the conical mirror reflects substantially all the light intensity from the plurality of laser diodes.

By virtue of these features, the light projection signaling device is much less bulky as the laser diodes may be deposed relatively close to the conical mirror.

According to embodiments, such a light projection signaling device may comprise one or more of the following features.

The light projection signaling device may be designed to project light in all or certain radial directions. For example, the light projection signaling device may be designed to project light into an angular sector.

According to one embodiment, the laser diodes are distributed in a balanced manner in all the radial directions around the cone axis such that the ratio of the light intensity reflected by the conical mirror in any two radial dimensions is always greater than 0.8. By virtue of these features, the light projection signaling device shines in a substantially uniform manner in all the radial directions. Thus, when the cone axis is vertical, the light projection signaling device emits a light intensity covering the entire aerial space around a plane perpendicular to the cone axis.

By virtue of these features, the light projection signaling device allows aerial signaling to be provided.

Preferably, the design of the light projection device achieves a good compromise between size and illuminating surface area.

According to one embodiment, the conical mirror has a cone angle in the range between $2\pi/3$ and $\pi/3$, preferably an angle of around $\pi/2$. The expression "cone angle" means the angle between two generators of the cone included within a plane also comprising the cone axis. In other words, the cone angle is the angle at the apex. The cone angle is therefore twice the half-angle at the apex.

According to one embodiment, the ratio between the second radius and the first radius is in the range between 70% and 90%, preferably around 80%. By virtue of these features, the conical surface is sufficient to reflect the light intensity from the laser diodes. By virtue of these features, the dimensions of the conical surface are small enough for the light projection signaling device to be of limited size.

According to one embodiment, the first radius is less than 50 mm, preferably less than 45 mm. By virtue of these features, the light signaling device is quite compact.

According to one embodiment, the laser diodes are distributed at equal distances from the cone axis. By virtue of these features, the maximum of the light intensity emitted by the laser diodes is arranged on a circle. By virtue of these features, the light intensity reflected by the conical mirror is substantially invariant by axial symmetry.

According to one embodiment, the laser diodes are distributed sequentially at equal distances from one another. By virtue of these features, the light intensity emitted by the light projection signaling device is uniform in all the radial directions.

The laser diodes may be oriented in different ways, as long as the light projection device reflects the light intensity from the plurality of diodes perpendicularly to the axis of the cone.

According to one embodiment, the laser diodes are oriented in such a manner as to emit the light intensity in a conical light sheet coaxial with the cone body. In a preferred embodiment, the plurality of laser diodes emits the light intensity in a conical light sheet which is a cylindrical light sheet coaxial with the cone body.

The various laser diodes of the plurality of laser diodes may be disposed according to variable distances from the conical mirror or according to substantially equal distances.

For example, the laser diodes are distributed on a conical annular strip coaxial with the cone axis, the apex of the conical mirror and of the conical annular strip facing each other, the laser diodes being furthermore oriented in such a manner as to emit the light intensity perpendicularly to the annular strip.

The cone angle of the annular strip is chosen in such a manner that the light projection device is able to reflect the light intensity from the plurality of diodes perpendicularly to the axis of the cone.

More precisely, if $\alpha$ is the cone angle of the annular strip and $\theta$ the cone angle of the conical mirror, then the cone angle $\theta$ of the conical mirror is substantially equal to $\theta=\pi-\alpha/2$.

For example, the annular strip has an annular strip cone angle $\alpha$ equal to $\alpha=\pi/2$ and the conical mirror has a conical mirror cone angle $\theta$ equal to $\theta=3\pi/4$.

According to a preferred embodiment, the annular strip has an annular strip cone angle $\alpha$ equal to $\alpha=\pi$ and the conical mirror has a conical mirror cone angle $\theta$ equal to $\theta=\pi/2$.

In other words, the plurality of laser diodes is distributed on an annular strip in a plane perpendicular to the cone axis and emits the light intensity in the direction of the axis of the cone, the direction of emission of the laser diodes being turned toward the conical mirror.

By virtue of these features, the light projection device reflects the light intensity from the plurality of diodes perpendicularly to the axis of the cone.

According to one embodiment, the light projection signaling device furthermore comprises a cylindrical glass element with a radius greater than the first radius and coaxial with the conical mirror, disposed around the conical mirror and the plurality of laser diodes.

According to one embodiment, the glass element is grooved in order to scatter the light intensity produced by laser diodes uniformly. By virtue of these features, the light intensity reflected by the conical mirror is scattered by each groove in such a manner as to increase the uniformity of the light intensity in all the radial directions.

The grooves of the cylindrical glass element may be formed in numerous ways. For example, the grooves are radial protrusions sequentially disposed on the outer surface or the inner surface of the cylindrical glass element. According to one embodiment, the radial protrusions are equidistant in the radial directions. According to one embodiment, the radial protrusions are invariant in the direction of the cone axis. According to another embodiment, the radial protrusions vary sinusoidally in the direction of the cone axis.

According to one embodiment, the light projection signaling device furthermore comprises a collimator device disposed between the laser diodes and the conical mirror, the collimator device being spaced from the laser diodes by a distance equal to the focal distance of the collimator device in order to direct the light intensity produced by the laser diodes toward the conical mirror in the form of a parallel beam.

According to one embodiment, the collimator device comprises a collimating lens in front of each laser diode.

According to one embodiment, the collimating lenses disposed in front of each laser diode are supported by a ring disposed between the plurality of laser diodes and the conical mirror, in a plane perpendicular to the cone axis.

The laser diodes may be designed to emit any desired wavelength or range of wavelengths.

According to one embodiment, the laser diodes emit a light of red color. By virtue of this feature, a light projection signaling device emitting red light may be obtained.

Alternatively, each laser diode emits a red, green or blue (RGB) color. For example, the laser diodes are disposed in such a manner that a pattern formed from three laser diodes, each one of a different RGB color, is sequentially repeated around the cone axis. By virtue of this feature, a light projection signaling device emitting white light may be obtained.

According to one embodiment, the laser diodes are for example Mitsubishi ML501P73 diodes.

According to embodiments, the conical mirror may be hollow or solid. For example, the conical mirror is hollow in its center. For example, the conical mirror is hollowed out according to a cylinder coaxial with the cone axis. By virtue of these features, the light projection signaling device is lighter. By virtue of these features, it is furthermore possible to make air flow through the light projection signaling device in order to allow better regulation of the temperature of the laser diodes.

BRIEF DESCRIPTION OF THE DRAWINGS

The invention will be better understood, and other aims, details, features and advantages of the latter will become more clearly apparent in the course of the following description of several particular embodiments of the invention, given solely by way of non-limiting examples, with reference to the appended drawings.

FIG. 4 is a perspective view of the light projection device in FIG. 1 equipped with a glass member.

FIG. 5 shows a diagram of the dimensions of the glass element with respect to the light projection device, seen from above.

FIG. 6 shows a schematic cross-sectional view of one variant of the light projection signaling device according to the invention.

DETAILED DESCRIPTION OF THE PREFERRED EMBODIMENT(S)

With reference to FIGS. 1 to 5, a light projection signaling device 1 is shown.

The light projection signaling device 1 comprises a reflecting mirror 16 designed to project the light in all the radial directions.

The light projection signaling device 1 furthermore comprises a light source 17 designed to emit light in the direction of the reflecting mirror.

The light projection signaling device 1 also comprises a collimator device 18 disposed between the light source 17 and the reflecting mirror 16 and designed to collect the light emitted by the light source 17 in order to project it onto the reflecting mirror 16.

Figure 1:
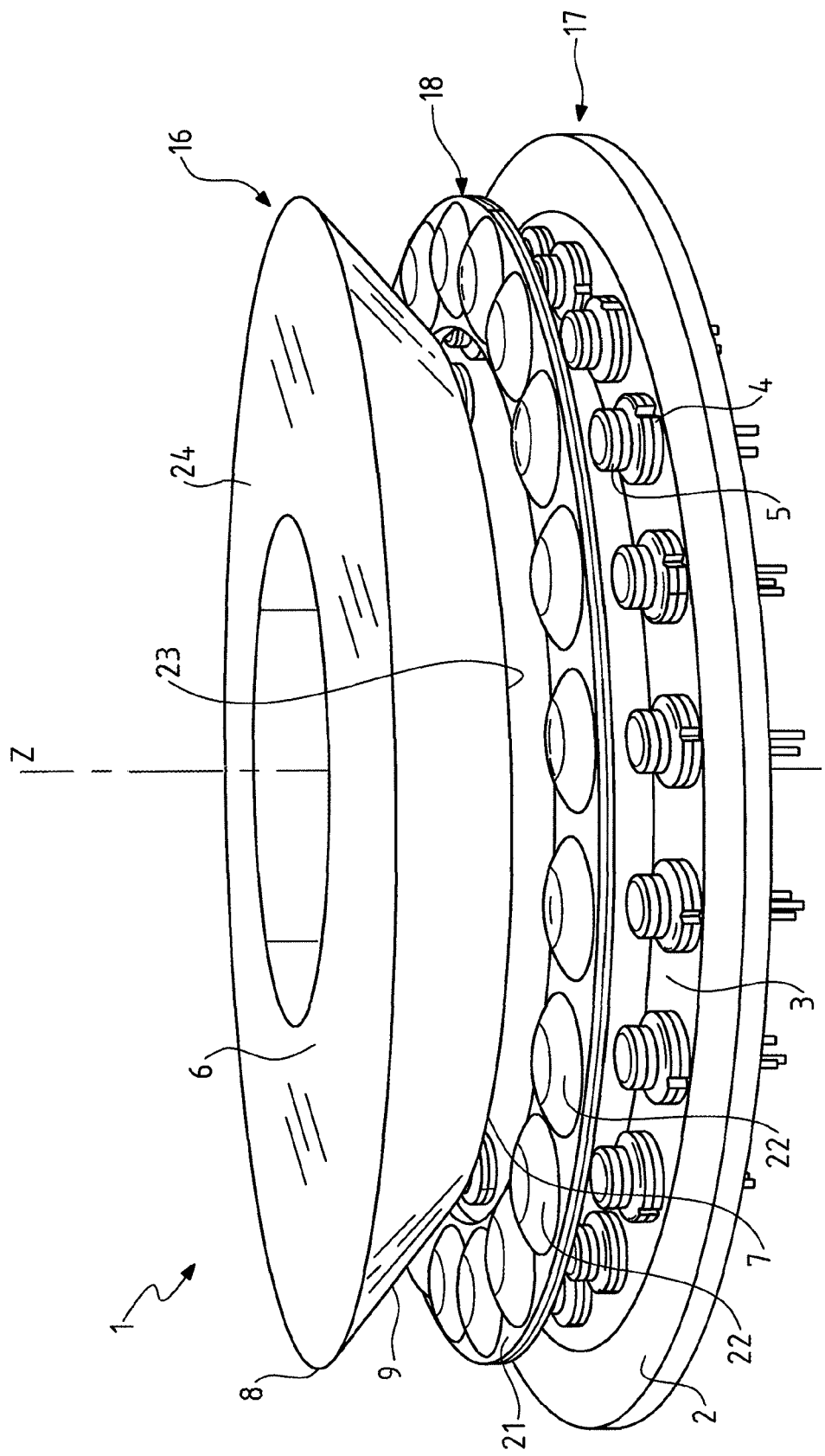
FIG. 1 is a perspective view of a light projection signaling device according to the invention.
Figure 2:
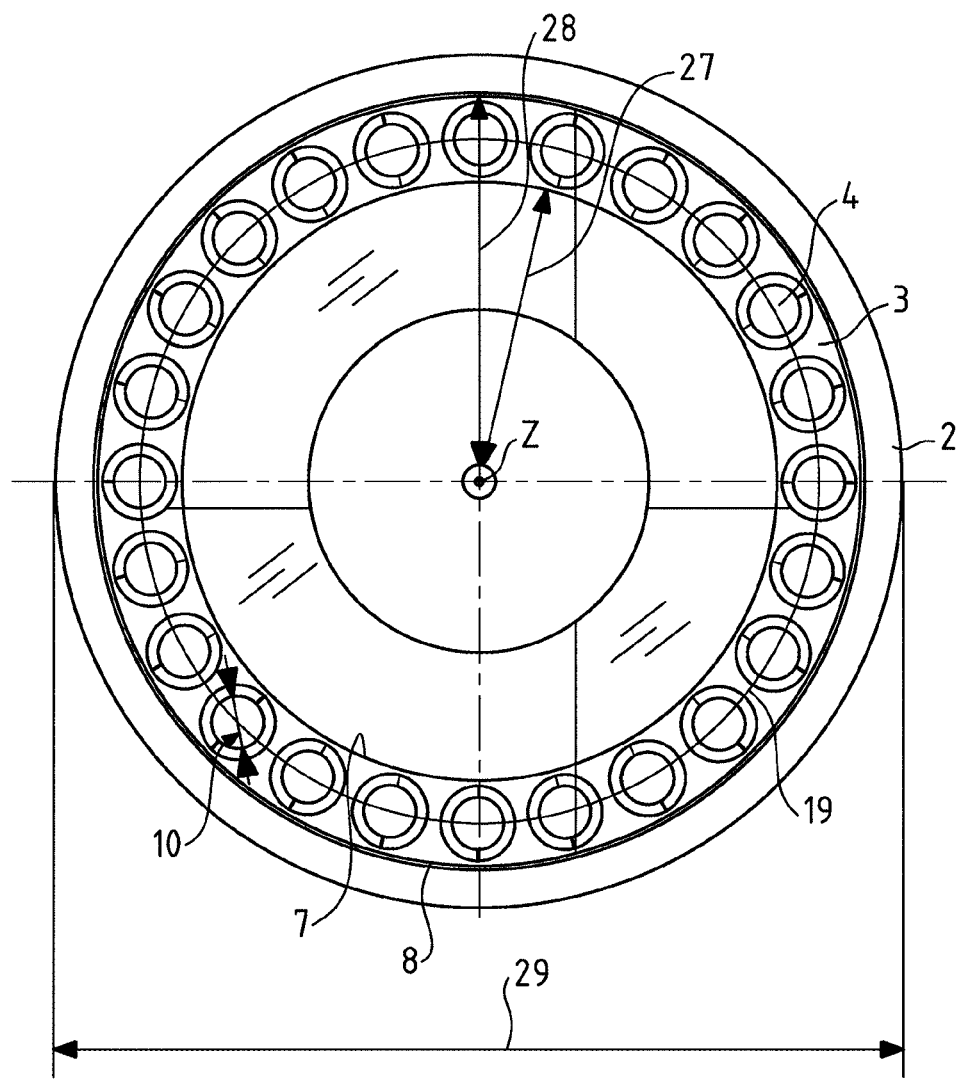
FIG. 2 is a diagram showing the dimensions of the light projection device in FIG. 1, seen from above.
Figure 3:
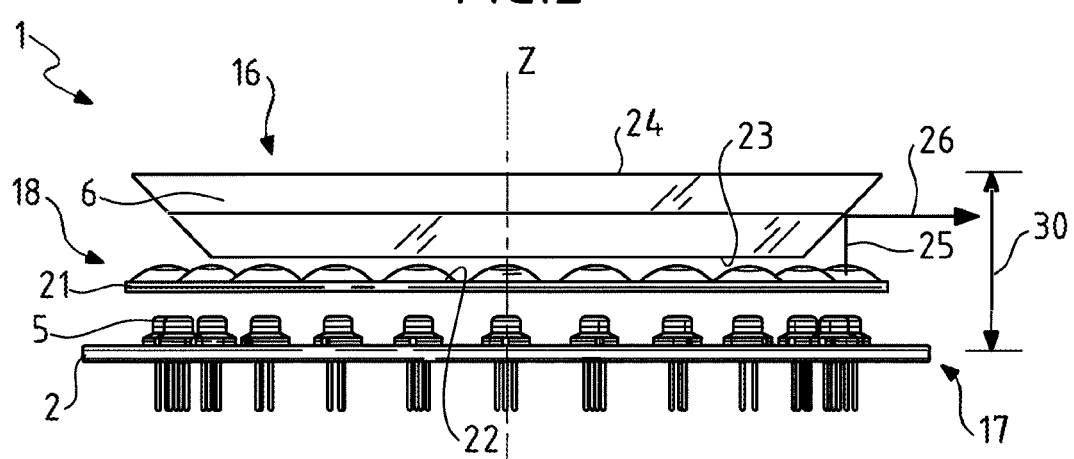
FIG. 3 is a front view of the light projection device in FIG. 1.

Each of these elements 16, 17 and 18 and the arrangement of the elements 16, 17 and 18 will be described with reference to FIGS. 1 to 3.

The light projection signaling device 1 has an overall approximately cylindrical shape with an axis Z.

In the description and the claims, the terms "outer" and "inner", the terms "lower" and "higher/upper", together with the orientations "axial" and "radial" will be used to denote elements of the light projection signaling device 1 according to the definitions given in the description. By convention, the "radial" orientation is directed orthogonally to the axis Z determining the "axial" orientation. The terms "outer" and "inner" are used to define the relative position of one element with respect to another, by reference to the axis Z. An element close to the axis is thus defined as inner, as opposed to an outer element situated radially on the periphery. By convention, the terms "higher/upper" and "lower" are used to define the relative position of one element with respect to another, by reference to a plane perpendicular to the axis Z. For example, the light source 17 is lower than the collimator device 18 and the reflective mirror 16 is higher than the collimator device 18.

The reflecting mirror 16 of the light projection signaling device 1 comprises a truncated cone 6. The truncated cone 6 is invariant by symmetry of revolution about a vertical axis z.

The truncated cone 6 is a solid fabricated using materials such as metal, plastic or glass.

The truncated cone 6 has a reflective outer surface 9. This outer surface 9 may consist of a reflective material different from the material constituting the truncated cone or may consist of a polishing of the material forming the truncated cone. The outer surface 9 has a reflectivity to the wavelengths in the range between 632 nm and 644 nm of higher than 95%.

The truncated cone 6 also has an upper surface and a lower surface. The truncated cone 6 is hollowed out around its axis Z. The opening is a coaxial hollow cylinder with a diameter equal to 40 mm.

The cone angle of the truncated cone 6 is equal to $\pi/2$.

The lower surface is a ring 23 and the upper surface is a ring 24 with an outer diameter greater than that of the lower surface. The ring 23 is bounded by an outer circle 7 of radius 27 equal to 35 mm. The ring 24 is bounded by an outer circle 8 of radius 28 equal to 44 mm.

The light source 17 of the light projection signaling device 1 comprises a support in the form of a disk 2.

The disk 2 is disposed in a plane perpendicular to the axis Z.

The center of the disk 2 is disposed on a point of the axis Z.

The disk 2 has a diameter 29 equal to 100 mm.

The disk 2 has through-holes at 24 locations 4 equally distributed on an outer annular surface 3. The annular surface 3 is centered on a circle 19 of diameter equal to 80 mm. The disk 2 has three orifices formed at each location 4.

The light source 17 furthermore comprises 24 laser diodes 5 disposed on the circle 19. A laser diode 5 is disposed on the support 2, at each location 4.

By virtue of this number of laser diodes 5 distributed around the axis Z, the light emitted by the laser diodes 5 toward the reflecting surface 9 is substantially the same in all the radial directions.

A laser diode 5 has three electrical pins. The three electrical pins are plugged into the three orifices of a location 4. This disposition allows the laser diodes 5 to be electrically powered via the electrical pins by means of an electrical power supply disposed under the lower surface of the disk 2. The laser diodes 5 are powered via an electrical cable connected to a generator, or by a battery (not shown).

The laser diodes 5 are of the ML501 P73 type marketed by Mitsubishi Electric.

Each laser diode 5 emits a beam of monochromatic light at a wavelength of around 638 nm.

The laser diodes 5 have a light intensity of 130 lm/W. The laser diodes 5 emit an optical power of 0.5 W. The laser diodes 5 have a diameter 10 equal to 5.6 mm. By virtue of the use of laser diodes 5, the light intensity emitted by a limited number of laser diodes is sufficient to build a light projection device, while at the same time keeping within a limited size.

The number 24 of laser diodes 5 is chosen so as to reach a compromise between, on the one hand, the requirements for uniformity and for light intensity emitted by the light projection signaling device 1 and, on the other hand, the size of the light projection signaling device 1.

As the technologies of laser diodes are evolving, this number could be optimized and modified according to the improvement over time of the light intensity emitted by laser diodes.

Each laser diode 5 is oriented in such a manner that the beam of light that it emits is emitted in the direction of the axis Z.

The laser diodes 5 exhibit a parallel beam divergence equal to 7.5°, and a perpendicular beam divergence equal to 35° degrees.

The collimator device 18 allows the light beam emitted by the laser diodes 5 to be concentrated by reducing the divergence of the beam and projecting it in the direction of the axis Z onto the reflecting surface 9.

As the cone angle of the truncated cone 6 is equal to $\pi/2$, the light beam emitted by each laser diode 5 is reflected by the reflecting surface 9 about a plane perpendicular to the axis Z.

When the light projection signaling device 1 is disposed in such a manner that the axis Z is vertical, the light beams 25 emitted by the laser diodes 5 are projected into a horizontal light sheet 26 in all the radial directions.

Thus, by positioning the light projection signaling device 1 directly on top of a pylon, the pylon is made visible to aerial vehicles, for example to aircraft.

The collimator device 18 comprises an annular support 21. The annular support 21 is disposed in a plane perpendicular to the axis Z and the center of the annular support 21 is situated on a point of the axis Z.

The annular support 21 has an inner diameter equal to 70 mm and an outer diameter equal to 88 mm.

The annular support 21 has 24 uniformly distributed locations 22. Collimating lenses 22 are disposed on the locations 22.

The annular support 21 is disposed on top of the annular surface. The radial positions of the collimating lenses 22 coincide with the radial positions of the laser diodes 5.

Thus, each laser diode 5 is below a collimating lens 22. The collimating lens 22 thus concentrates the light beam 25 emitted by the laser diode 5 by reducing the divergence of the light beam.

The collimating lenses 22 are selected according to the divergence and to the size of the laser diodes 5. For example, the collimating lenses have a focal length of 6 mm.

The collimating lenses are positioned at the focal distance from the laser diodes 5. However, the distance separating the collimating lenses 22 may differ slightly from the focal distance in order to broaden the light beams produced by the laser diodes 5 and to improve the robustness of the light projection signaling device 1 with respect to the tolerances of its various constituent components, in other words to the tolerances of the laser diodes 5, collimating lenses 22 and of the reflecting mirror 16.

The light projection signaling device 1 according to the invention has a vertical dimension 30, measured between the upper surface of the disk 2 and the upper surface of the ring 24, equal to 20 mm.

This vertical dimension 30 is reduced with respect to a light projection device designed with a non-truncated conical mirror.

Notably, the diameter, equal to twice the radius 27 of the outer circle 7, is equal to the outer diameter of the annular support 23 and the diameter, equal to twice the radius 28 of the inner circle 8, is equal to the inner diameter of the annular support 23. This disposition allows all the light from the light beams 25 projected onto the reflecting outer surface 9 to be collected.

Thus, the design of the light projection signaling device 1 according to the invention provides a light projection signaling device 1 of limited size.

With reference to FIGS. 4 and 5, another aspect of the light projection signaling device 1 according to the invention will be described.

The light projection signaling device 1 comprises a cylindrical glass element 31 with a diameter of at least 100 mm and an axis Z. The cylindrical glass element 31 is disposed around the assembly formed by the collimator device 18, the light source 17 and the reflecting mirror 16.

The cylindrical glass element 31 has a dimension along the axis Z equal to the dimension 30, in other words equal to 20 mm. The cylindrical glass element 31 has an upper edge disposed substantially in the same plane as the ring 24 in order to protect the assembly formed by the collimator device 18, the light source 17 and the reflecting mirror 16.

The cylindrical glass element 31 has an outer surface 32 grooved in the direction of the axis Z. This feature allows the light sheet 26 to be radially scattered in such a manner as to be uniform.

Notably, the difference in light intensity emitted in the various radial directions is less than 25%.

The elements 16, 17 and 18 and the cylindrical glass element 31 of the light projection signaling device 1 are arranged in a housing (not shown) designed to hold them in their respective positions.

With reference to FIG. 6, a variant of the light projection signaling device 1 according to the invention will be described. The elements similar to those shown with reference to FIGS. 1 to 5 are referenced with the same numbers.

In this variant, the laser diodes 5 are distributed on a conical annular strip 103 coaxial with the cone axis.

The apex of the conical mirror 16 and of the conical annular strip 103 are facing each other.

The laser diodes 5 are oriented so as to emit the light intensity perpendicularly to the conical claim. The use of the indefinite article "a" for an element or a step does not exclude, unless otherwise stated, the presence of a plurality of such elements or steps.

In the claims, any reference indicated between parentheses should not be interpreted as a limitation of the claim.

annular strip 103.

The cone angle α of the annular strip and the cone angle θ of the conical mirror are linked by the following relationship: θ=π−α/2. This relationship allows for the light projection signaling device 1 to project a light sheet 26 perpendicular to the axis Z.

For example, the annular strip has an annular strip cone angle α equal to α=π/2 and the conical mirror has a conical mirror cone angle θ equal to 0=3π/4.

The embodiment shown in FIGS. 1 to 5 is therefore a particular case of this relationship θ=π−α/2 in which α=π and θ=π/2.

Although the invention has been described in association with several particular embodiments, it goes without saying that it is in no way limited to these and that it comprises all the techniques equivalent to the means described, together with their combinations if the latter fall within the framework of the invention.

The use of the verb "comprise" or "include" and of their conjugated forms does not exclude the presence of other elements or of steps other than those claimed in a

The invention claimed is:

1. A light projection device for a light signaling function (1), comprising
   a conical mirror (16) having a truncated cone shape (6) with a symmetry of revolution about a cone axis (Z),
   a plurality of laser diodes (5) disposed around the cone axis (Z) and emitting a light intensity toward the conical mirror (16),
   the conical mirror (16) having furthermore a first end edge and a second end edge perpendicular to the cone axis (Z), the first end edge of the conical mirror (16) being a circle (8) having a first radius and the second end edge of the conical mirror (16) being a circle (7) having a second radius (27), less than the first radius (28), the second edge being turned toward the laser diodes (5), the inclination of the laser diodes with respect to a conical surface (9) is such that the light projection device (1) reflects the light intensity from the plurality of diodes (5) perpendicularly to the axis of the cone (Z),
   the laser diodes (5) being disposed at distances from the axis of the cone (Z) in the range between the first radius (28) and the second radius (27), in such a manner that the conical mirror reflects substantially all the light intensity from the plurality of laser diodes,
   wherein the light projection device comprises a collimator device (18) disposed between the laser diodes (5) and the conical mirror (16), the collimator device (18) being spaced from the laser diodes (5) by a distance equal to the focal distance of the collimator device (18) in order to direct the light intensity (25) produced by the laser diodes toward the conical mirror in the form of a parallel beam (26).

2. The light projection device for a light signaling function as claimed in claim 1, wherein the laser diodes (5) are distributed in a balanced manner in all the radial directions around the cone axis such that the ratio of the light intensity (26) reflected by the conical mirror in any two radial dimensions is always greater than 0.8.

3. The light projection device for a light signaling function (1) as claimed in claim 2, wherein the first radius (28) is less than 50 mm, preferably less than 45 mm.

4. The light projection device for a light signaling function (1) as claimed in claim 2, wherein the laser diodes (5) are distributed at equal distances from the cone axis (Z).

5. The light projection device for a light signaling function (1) as claimed in claim 2, wherein the laser diodes (5) are distributed on an annular strip (3) in a plane perpendicular to the cone axis (Z).

6. The light projection device for a light signaling function (1) as claimed in claim 2, wherein the plurality of laser diodes (5) emits the light intensity in the direction of the axis of the cone (Z), the direction of emission of the laser diodes (5) being turned toward the conical mirror (16), the conical mirror (16) having a cone angle of around π/2.

7. The light projection device for a light signaling function (1) as claimed in claim 1, wherein the first radius (28) is less than 50 mm, preferably less than 45 mm.

8. The light projection device for a light signaling function (1) as claimed in claim 7, wherein the laser diodes (5) are distributed at equal distances from the cone axis (Z).

9. The light projection device for a light signaling function (1) as claimed in claim 7, wherein the laser diodes (5) are distributed on an annular strip (3) in a plane perpendicular to the cone axis (Z).

10. The light projection device for a light signaling function (1) as claimed in claim 7, wherein the plurality of laser diodes (5) emits the light intensity in the direction of the axis of the cone (Z), the direction of emission of the laser diodes (5) being turned toward the conical mirror (16), the conical mirror (16) having a cone angle of around $\pi/2$.

11. The light projection device for a light signaling function (1) as claimed in claim 1, wherein the laser diodes (5) are distributed at equal distances from the cone axis (Z).

12. The light projection device for a light signaling function (1) as claimed in claim 11, wherein the laser diodes (5) are distributed on an annular strip (3) in a plane perpendicular to the cone axis (Z).

13. The light projection device for a light signaling function (1) as claimed in claim 11, wherein the plurality of laser diodes (5) emits the light intensity in the direction of the axis of the cone (Z), the direction of emission of the laser diodes (5) being turned toward the conical mirror (16), the conical mirror (16) having a cone angle of around $\pi/2$.

14. The light projection device for a light signaling function (1) as claimed in claim 1, wherein the laser diodes (5) are distributed on an annular strip (3) in a plane perpendicular to the cone axis (Z).

15. The light projection device for a light signaling function (1) as claimed in claim 14, wherein the plurality of laser diodes (5) emits the light intensity in the direction of the axis of the cone (Z), the direction of emission of the laser diodes (5) being turned toward the conical mirror (16), the conical mirror (16) having a cone angle of around $\pi/2$.

16. The light projection device for a light signaling function (1) as claimed in claim 1, wherein the plurality of laser diodes (5) emits the light intensity in the direction of the axis of the cone (Z), the direction of emission of the laser diodes (5) being turned toward the conical mirror (16), the conical mirror (16) having a cone angle of around $\pi/2$.

17. The light projection device for a light signaling function as claimed in claim 1, furthermore comprising a cylindrical glass element (31) with a radius greater than the first radius (28) and coaxial with the conical mirror (16), disposed around the conical mirror (16) and the plurality of laser diodes (5).

18. The light projection device for a light signaling function (1) as claimed in claim 17, wherein the glass element (31) is grooved in order to scatter the light intensity produced by the laser diodes (5) uniformly.

19. The light projection device for a light signaling function (1) as claimed in claim 1, wherein the collimator device (18) comprises a collimating lens (22) in front of each laser diode.

* * * * *